United States Patent [19]

Buckler et al.

[11] 4,242,424

[45] Dec. 30, 1980

[54] FLAT BATTERY

[75] Inventors: Sheldon A. Buckler, Lincoln; Fredric S. Cohen, Waltham; David P. Kennedy, Cambridge, all of Mass.

[73] Assignee: Polaroid Corporation, Cambridge, Mass.

[21] Appl. No.: 894,369

[22] Filed: Apr. 7, 1978

Related U.S. Application Data

[62] Division of Ser. No. 763,058, Jan. 27, 1977.

[51] Int. Cl.³ .................... H01M 4/36; H01M 6/12
[52] U.S. Cl. ................................ 429/152; 429/162;
429/229; 429/230
[58] Field of Search ............. 429/152, 153, 149, 162,
429/229, 230, 224, 209, 232, 231, 217;
252/182.1

[56] References Cited

U.S. PATENT DOCUMENTS

| | | | |
|---|---|---|---|
| 1,538,895 | 5/1925 | Hirsch et al. | 429/229 X |
| 2,623,915 | 12/1952 | Moulton | 429/217 |
| 2,931,846 | 4/1960 | Cunningham et al. | 429/217 |
| 3,056,849 | 10/1962 | Warren et al. | 429/229 X |
| 3,954,506 | 5/1976 | Sullivan | 429/217 |
| 4,105,815 | 8/1978 | Buckler | 429/152 |
| 4,118,551 | 10/1978 | Chireau et al. | 429/217 X |
| 4,119,770 | 10/1978 | Land | 429/152 |
| 4,137,627 | 2/1979 | Kinsman | 429/162 X |

Primary Examiner—Anthony Skapars
Attorney, Agent, or Firm—John W. Ericson

[57] ABSTRACT

The method of making a thin flat laminar battery comprising the steps of coating a substrate with a dispersion of zinc powder and water to produce an anode slurry, and thereafter diffusing electrolytes into said anode slurry; and electrical cells and batteries made by this process.

15 Claims, 6 Drawing Figures

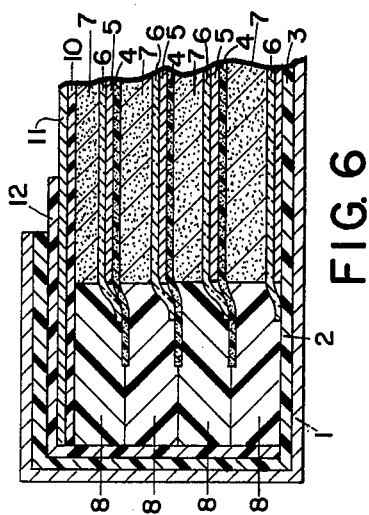
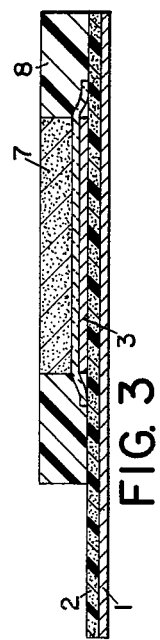
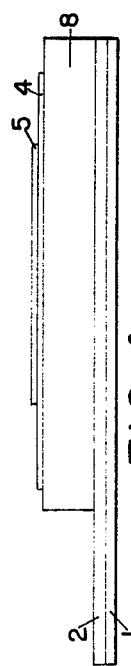
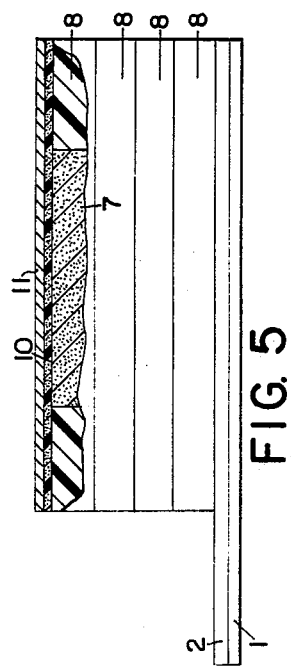

FLAT BATTERY

This is a division of application Ser. No. 763,058, filed Jan. 27, 1977.

This invention relates to novel electrical cells and batteries, and to a novel method of making the same.

The thin flat laminar battery has been highly developed in recent years, particularly for photographic applications in which a battery is incorporated in a film cassette to serve as the power supply for an automatic camera in which film units in the cassette are exposed and processed. Specifically, the now familiar Polaroid SX-70 Land film pack incorporates such a battery.

U.S. Application for Letters Patent Ser. No. 684,370, now abandoned was filed on May 7, 1976 by Edwin H. Land for Electrical Cells and Batteries, and is assigned to the assignee of this application. In Application Ser. No. 684,370, a battery of extremely high current drain capability is described. Batteries of this kind, made to dimensions suitable for insertion in the Polaroid SX-70 Land film pack in place of the battery currently so installed, make it possible to use the SX-70 camera with an electronic flash unit of, for example, 40 watt seconds output. Moreover, instead of the recharge times between flashes of ten to twenty seconds that would be expected, times between four and five seconds for the tenth flash are attainable. Such performance involves peak current densities of 1200 to 1700 milliamperes per square inch of cell electrodes, and average levels of 850 milliamperes per square inch for several seconds.

In common with the batteries currently made and sold as a component of the SX-70 film pack, the batteries described in the above-cited application employ a so-called "dry patch" anode construction. The dry patch anode is made from a slurry of zinc powder with a little carbon black in a medium comprising water with dispersants and a binder. This slurry is laid down on a current collector and dried. The dried patch is wet with gel electrolyte during the assembly of the battery, and thus brought into electrochemical communication with the cathode through the separator. Anodes so formed have proven remarkably effective, but the several steps in their manufacture just outlined obviously leave something to be desired in manufacturing cost and complexity compared with the manufacture of the cathodes. As more fully described in the above cited application, the cathodes are formed as slurries, which are simply laid down by extrusion in completed form.

U.S. Application for Letters Patent Ser. No. 495,681, now abandoned was filed on Aug. 8, 1974 by Sheldon A. Buckler for Flat Battery, and is assigned to the assignee of this application. In Application Ser. No. 495,681, slurry anode compositions are disclosed which can be laid down by extrusion without the requirements for drying, binders or subsequent gel coating. Anode compositions of this kind are capable of good performance at moderately high current drains, and can be used to make batteries for very high drain electronic flash systems that are excellent by prior art standards. However, in batteries that are otherwise of the same construction, these slurry anodes show a considerably higher internal impedance and significantly longer flash unit recharge times than the dry patch anodes.

The objects of this invention are to enable the manufacture of laminar batteries with the performance capabilities of those disclosed in the above-cited application Ser. No. 684,370, while simplifying the manufacture of such batteries and reducing the number of steps and the amounts of material required in their construction.

Briefly, the above and other objects of the invention are obtained by a novel method of battery manufacture in which the anodes, as well as the cathodes, are preferably formed as aqueous slurries. Highly efficient slurry cathode compositions are described in the above cited copending Application Ser. No. 684,370. Cells and batteries formed in accordance with the present invention preferably incorporate such cathodes. The anodes, however, are made by a novel process that results in high current drain capability of the battery, coupled with low internal impedance and ease of manufacture.

In essence, the process of the invention comprises the manufacture of an aqueous slurry of zinc in water that contains between 10 and 20 percent, and most preferably from 13 to 15 percent, of water by weight of slurry. A trace amount of a water soluble polymeric suspending agent is preferably incorporated in order to improve the rheological properties of the dispersion, to prevent separation of the solid from the liquid, and to facilitate blending. Suitable suspending agents are hydroxyethyl cellulose, methyl cellulose, carboxymethyl cellulose, and the like. This slurry is then laid down by extrusion, silk screening, or similar techniques, in a very thin patch on a suitable current collector or intercell connector, such as a conductive plastic sheet.

The zinc slurry patch thus formed on the conductive substrate is then covered with a separator soaked in a solution of electrolytes, comprising the conventional Leclanche electrolyte system of zinc chloride and ammonium chloride, in which ammonium chloride preferably predominates for lower impedance. The electrolyte solution also preferably includes mercuric chloride, to effect amalgamation of the zinc after the pre-soaked separator is put in place. As this amalgamation occurs, the zinc chloride and ammonium chloride permeate the slurry by diffusion. The essence of the process is to disperse the zinc in the water and deposit the zinc slurry at the desired electrode site before the electrolytes are added. This results in highly superior electrical qualities which are not obtainable if an electrolyte solution is mixed with zinc powder in the conventional manner, because by that procedure one cannot attain nearly so low a proportion of water. The reason is that the salts in the electrolyte tend to cause the zinc to set up like concrete. In order to render the mix workable, rather large quantities of solution have to be included. The result is a relatively high internal impedance, as compared, for example, with the dry patch form of anode used in the battery currently supplied in the SX-70 film pack. Slurries in accordance with the invention tend to be easily extruded into very thin layers. In fact, a characteristic of cells in accordance with the invention is the use of anode slurries so thin that the zinc content is less than that theoretically required by the overall cell reaction.

The preferred mode of practicing the invention, and the characteristics of cells and batteries produced thereby, will best be understood in the light of the following detailed description, together with the accompanying drawings, of various illustrative embodiments thereof.

In the drawings,

FIG. 2 is a schematic elevational cross sectional sketch of certain components of the battery assembly at an early stage of manufacture by the process of FIG. 1, illustrating components of the battery as they appear after a first step in the assembly, and taken essentially along the lines 2—2 in FIG. 1;

FIG. 3 is a schematic elevational cross sectional sketch similar to that of FIG. 2 but showing the components as they appear following a second step in the process of assembly of FIG. 1;

FIG. 4 is a schematic elevational sketch similar to that of FIGS. 2 and 3, taken substantially along the lines 4—4 in FIG. 1 and illustrating the appearance of the components as they appear after a third step in the assembly process in FIG. 1

FIG. 5 is a schematic elevational sketch, with parts shown in cross section, similar to the sketches of FIGS. 2 through 4 and showing the battery in a final step in the assembly process of FIG. 1; and FIG. 6 is a fragmentary schematic elevational sketch, with parts shown in cross section and parts broken away, illustrating a finished battery in accordance with the process of FIG. 1.

Figure 1:
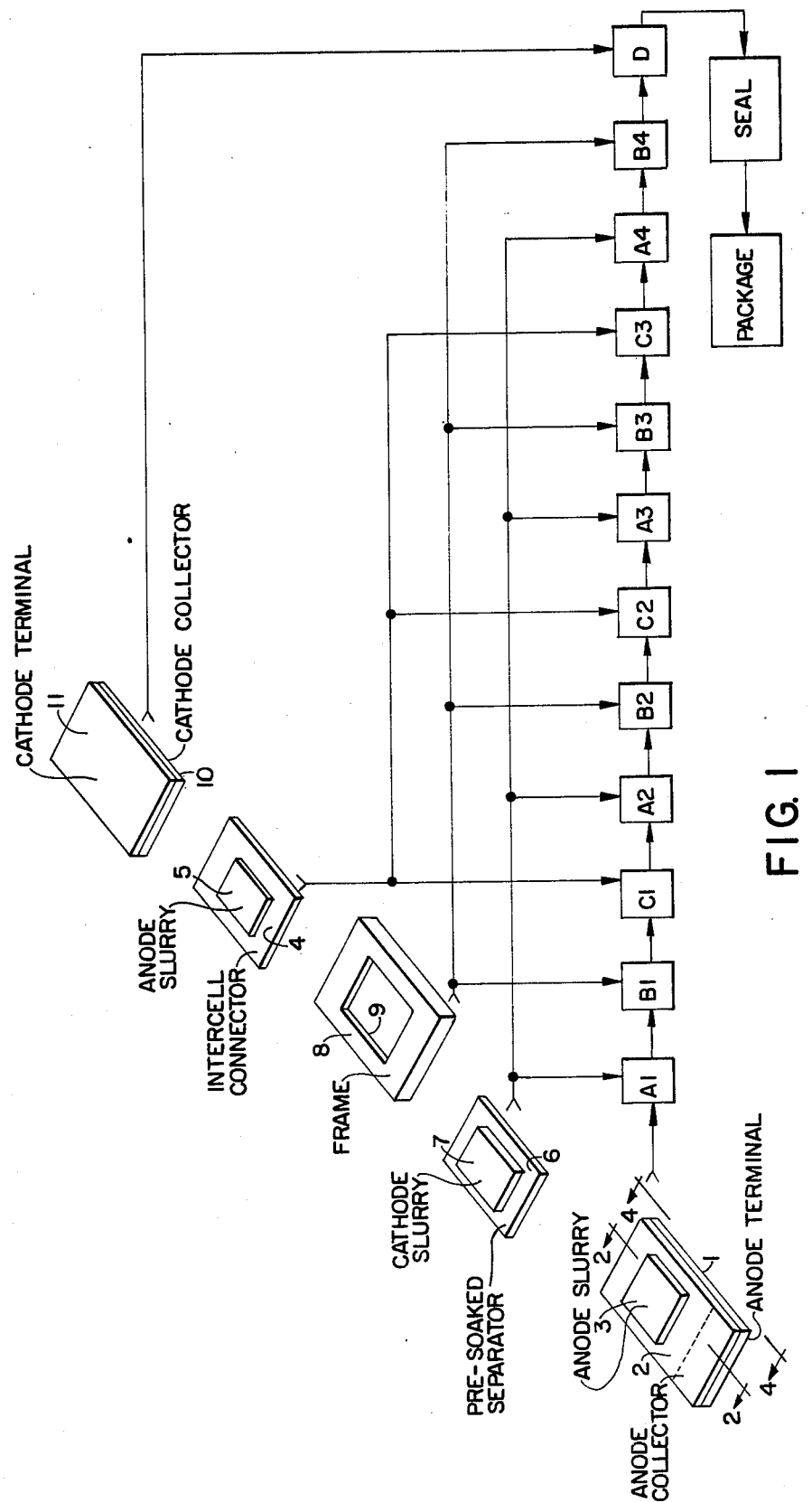
FIG. 1 is a schematic perspective sketch of various components used in the manufacture of a battery in accordance with the invention, in association with a block and flow diagram illustrating the sequence of assembly of the components.

The first step in the preparation of an anode assembly in accordance with the invention is to disperse zinc powder in water. Example I below illustrates the presently preferred formulation and method used in accordance with the invention for this purpose.

EXAMPLE I

A dispersion of zinc powder was made with the following composition, in which weights are given in grams:

|  | Wt. | Wt. % |
|---|---|---|
| Zn | 150 | 85.6 |
| $H_2O$ | 25 | 14.3 |
| Natrosol 250 | 0.2 | 0.1 |
| Total | 175.2 | 100.0 |

Natrosol 250 in hydroxyethyl cellulose as made and sold by Hercules, Inc. of Wilmington, Delaware. The hydroxyethyl cellulose is dissolved in the water with stirring. The zinc powder is added to the solution, with stirring, to form a smooth, uniform and easily flowable mix without separation.

Anode slurries in accordance with the invention, as exemplified by Example I above, are laid down on a conductive substrate by silk screening, extrusion or the like. In particular, referring now to FIG. 1 of the drawings, a terminal anode assembly is made up on a substrate comprising an outer anode terminal 1, of tinned steel, aluminum or the like, prelaminated in any conventional manner to a conductive plastic anode collector sheet 2. The collector sheet 2 may be made of any suitable thermoplastic resin filled with carbon black to make it conductive. The presently preferred material for this purpose is a carbon filled vinyl sold under the trademark Condulon by Pervel Industries, Inc. The anode slurry is not dried; i.e., it is kept wet during cell assembly.

In accordance with the presently preferred practice of the invention, the anode terminal 1 and cathode collector sheet 2 are each approximately 2 mils in thickness. In accordance with one particular embodiment of the invention to be described, these sheets were 2.8 by 3.4 inches in lateral dimensions. On the surface of the cathode collector 2, the zinc anode slurry, in accordance with Example I above, is laid down by silk screening over an area of approximately 2½ by 1½ inches and to a weight of approximately ½ gram. As indicated in FIG. 1, the anode assembly comprising the metal terminal 1 and the collector sheet 2 is longer on one end, to allow for folding over at the end of the process.

Inner anode assemblies in a battery in accordance with the invention are made on intercell connectors 4 which may be of conductive plastic of the same dimensions as the current collector sheet 2. An anode slurry patch 5 is laid down on each of the intercell connectors 4 in the same manner as described for the anode terminal assembly. For a four cell battery, three such intercell connectors 4 with applied patches 5 are required.

Referring again to FIG. 1, separators 6, of which four are required for a four cell battery, are pre-soaked in an electrolyte solution. Various conventional separator materials may be employed, but it is preferred at present to use 1.34 mil cellophane, free of humectants and plasticizers as the separator material. The solution in which the separators 6 were soaked in the illustrative embodiment had the following composition, expressed as weight percent based on the weight of total solution:

| Water | 64.0 |
|---|---|
| Ammonium Chloride | 22.0 |
| Zinc Chloride | 10.0 |
| Mercuric Chloride | 4.0 |
| Total | 100.0 |

In the illustrative embodiment here described, each of the separators taken up about 0.3 grams of the above solution. Soaking time is not particularly critical; essentially the same results have been achieved with separators soaked from 3 minutes to 20 minutes. On the pre-soaked separators 6 are applied cathode slurry patches, which may be of any conventional composition but in the presently preferred embodiment of the invention were of the following composition, expressed as parts by weight:

| $MnO_2$ | 51.81 |
|---|---|
| Carbon Black | 6.48 |
| $H_2O$ | 27.80 |
| $NH_4CL$ | 9.56 |
| $ZnCl_2$ | 4.35 |
| Total | 100.0 |

Variations in the cathode slurry composition preferably keep the ratio of $MnO_2$ to carbon in the range from 6:1 to 12:1 by weight. The amount of water is preferably between 23 and 32 percent by weight based on the weight of slurry, and most preferably between 26 and 28 percent by weight, where pre-soaked separators are employed. If initially dry separators are used, the preferred range is from 28 to 32 percent of water, based on the weight of slurry.

The cathode slurry composition is laid down in the manufacture of hand made batteries with a spatula, using a mask. In production, it would preferably be done by extrusion. The area of the patches in the illustrative embodiment of the invention was 2½ by 1⅞ inches , corresponding to the dimensions of the anode slurries 3 and 5. 3.5 grams of cathode slurry was laid down per patch.

Referring again to FIG. 1, four frames 8 are required for each four cell battery to be assembled. The frames 8 may be made of Versalon TPX 1140, a thermoplastic polyamide resin made by General Mills Co. of Minneapolis, Minnesota, or they may be of polyvinyl chloride or other suitable thermoplastic or the like. In the particular embodiment here described, the frames were made of Versalon TPX 1140, 18 mils in thickness. The outer lateral dimensions of the frames 8 correspond to the lateral dimensions of the anode terminal assembly, excepting for the extension of the latter that will be folded over, and each frame is provided with an aperture 9, sized to receive the cathode slurry patch 7 without clearance.

Each battery requires a cathode terminal assembly comprising a cathode collector sheet 10, preferably of the same conductive plastic material as the intercell connectors 4 and the anode collector sheet 2, about 2 mils in thickness and of the dimensions of the anode collector assembly inside of the anode flap. The collector sheet 10 is pre-laminated in a conventional manner to a metal cathode terminal 11, of aluminum, tinned steel or the like, about 2 mils in thickness. Both the anode and cathode terminals were of tinned steel in the embodiment here described.

The method of assembling a battery in accordance with the invention will next be described with reference to FIG. 1, together with FIGS. 2 through 6. The first step in the process, indicated by the block A1 in FIG. 1, comprises the assembly of a pre-soaked separator 6 with its cathode slurry 7 over the terminal assembly, with the cathode slurry patch 7 in registry with the anode slurry patch 3. The result of this operation is as illustrated in FIG. 2. As soon as this step in the process has been accomplished, the electrolyte in the cathode slurry and in the separator 6 will begin to diffuse into the anode slurry 3. The zinc chloride and ammonium chloride will reach equilibrium concentrations in this process. The mercuric chloride will cause amalgamation of the zinc, with the result that essentially all of the mercury will soon find its way into the amalgam.

Using the slurry of Example I above and the cathode and electrolyte compositions given above, and assuming that the hydroxyethyl cellulose does not diffuse through the separator, and that the volume of liquid in the anode does not change, the initial equilibrium composition of the anode slurry will be as follows, in weight percent based on the weight of the slurry:

|  | Weight Percent |
| --- | --- |
| Zn | 82.4 |
| Hg | 1.7 |
| $H_2O$ | 10.7 |
| $NH_4Cl$ | 3.5 |
| $ZnCl_2$ | 1.6 |
| Hydroxyethyl cellulose | 0.1 |
| Total | 100.0 |

A particularly useful range of equilibrium anode compositions is from about 80 to 85 parts by weight of zinc powder, about 10 to 12 parts by weight of water, from about 1 to 2 parts by weight of zinc chloride, from about 2 to about 4 parts by weight of ammonium chloride, and from about 1 to about 3 parts by weight of mercury.

As the next step in the assembly process, illustrated at block B1 in FIG. 1, one of the frames 8 is put into position over the pre-soaked separator 6 with the cathode slurry 7 filling the opening in the frame 8.

Next, the first of the intercell connectors 4 with its anode slurry patch 5 is placed in registry over the frame 8 with the anode slurry 5 in registry with the cathode slurry 7 already in position as shown in FIG. 3. The result is the assembly shown in FIG. 4. This step is illustrated at block C1 in FIG. 1.

Comparing FIGS. 1, 2 and 4, as the next step in the assembly process, labeled A2 in FIG. 1, a second pre-soaked separator 6 with applied cathode slurry 7 is placed in registry over the intercell connector 4 and anode slurry 5 as in FIG. 4. The superpositioning will result in another cell structure of the kind shown in FIG. 2. Essentially, the operation is the same as described above in connection with block A1 in FIG. 1, except that the separator is now applied over the intercell connector 4 and its anode patch 5 rather than over the anode terminal assembly.

The subsequent step, illustrated at B2 in FIG. 1, is the same as step B1, in that a frame 8 is applied over the separator and cathode slurry now in position. The next step, labeled C2 in FIG. 1, involves the addition of the second intercell connector and anode slurry 5. The process just described is carried out repeatedly, as illustrated in FIG. 1, with the addition of a separator and cathode 7 at block A3, the third frame 8 at B3, the third intercell connector and anode slurry at block C3, and the final separator and cathode slurry 6 and 7 at block A4. Next, the last frame 8 is put into position, as suggested at B4 in FIG. 1.

As the last assembly step, shown at D in FIG. 1, the cathode terminal assembly, comprising the cathode collector 10 and metal terminal 11, are put in place over the last of the frames 8 in contact with the uppermost cathode slurry 7, as illustrated in FIG. 5. Next, the assembly is sealed by the application of heat and pressure around the periphery of the frames 8 and 9, effecting a thermally induced bond between the frames 8 and the adjacent intercell connectors, and cathode and anode collectors 10 and 2 in the regions not occupied by the wet separators 6. The result is a peripheral seal around the entire perimeter of the battery. As the last step in the process, as suggested in FIG. 1, the completed battery is packaged in any conventional manner, as by mounting on a card and covering with an insulating wrapper of polyethylene, polyvinyl chloride or the like, in a manner that, per se, forms no part of the present invention.

Referring to FIG. 6, following sealing, the extending portion of the anode terminal assembly comprising the metal terminal 1 and the conductive plastic sheet 2 may be folded around to bring the negative terminal of the battery into the same general plane as the positive terminal. As indicated in FIG. 6, this may involve the placement of an insulating sheet 12 of polyethylene, polyvinyl chloride, or the like, to prevent contact between the anode collector 2 and terminal 1 and the intervening layers of the battery, and particularly with the positive metal terminal 11 and the cathode collector 10.

Four, four cell batteries were made in accordance with the process described above, and with the anode composition of Example I in combination with the other specific formulations and procedures described above. These batteries were measured for open circuit voltage (OCV) and closed circuit voltage (CCV) from one to two hours after manufacture. The CCV values were measured at 1.63 amperes for 50 milliseconds. The batteries were then tested for electronic flash charging performance with a flash simulator circuit. The flash simulator circuit has an operating cycle comprising a charge simulating period during which 4 amperes of continuous constant current was drawn from the battery under test until 80 watt seconds had been delivered to the simulator. Each charge simulating period was followed by a thirty second rest period. The times required to carry out the tenth and the twentieth charge simulating period were measured. The number of cycles carried out before the batteries reached closed circuit voltages of 3.6 volts and 3.0 volts were recorded. The results were as recorded in the following table:

| Battery | 1-2 hr. OCV | 1-2 hr. CCV | 24 hr. OCV | 24 hr. CCV | Charge Time Seconds 10th Cycle | Charge Time Seconds 20th Cycle | Cycles to 3.6 v. | Cycles to 3.0 v. |
|---|---|---|---|---|---|---|---|---|
| 1 | 6.839 | 6.529 | 6.846 | 6.509 | 4.3 | 5.2 | 19 | 23 |
| 2 | 6.821 | 6.525 | 6.832 | 6.508 | 4.4 | 5.4 | 18 | 21 |
| 3 | 6.801 | 6.523 | 6.815 | 6.498 | 4.4 | 5.1 | 20 | 24 |
| 4 | 6.871 | 6.588 | 6.879 | 6.562 | 4.3 | 4.8 | 23 | 27 |
| Average | 6.833 | 6.541 | 6.843 | 6.519 | 4.35 | 5.13 | 20 | 23.8 |

The average impedance of these batteries, as indicated by the average values of OCV and CCV 24 hours after manufacture, was 0.2 ohms, or 0.05 ohms per cell, at 1.63 amperes.

Other anode slurries that have been prepared and used in the manufacture of batteries are given in the following examples.

EXAMPLE II

|  | Wt. | Wt.% |
|---|---|---|
| Zinc powder | 150 | 85.7 |
| Water | 25 | 14.3 |
| Total | 175 | 100.0 |

The zinc powder was added to the water with stirring. A rather low viscosity slurry was formed.

Three batteries were made in the manner described above, except that 0.5 grams of the slurry of Example II above was used to form the anode. Two of these batteries failed through internal short circuits; apparently caused by an error in assembly. The third battery had an OCV of 6.638 volts, a CCV of 6.255 volts, and operated the flash simulator for 21 cycles before reaching 3.0 volts. The charge time for the 10th cycle was 4.9 seconds, and for the 20th cycle, 6.1 seconds.

EXAMPLE III

|  | Wt. | Wt.% |
|---|---|---|
| Zinc powder | 150 | 85.52 |
| Water | 25.36 | 14.46 |
| Tetrasodium Pyrophosphate | .04 | .02 |
| Total | 175.4 | 100.0 |

0.4 grams of a ten percent by weight aqueous solution of tetrasodium pyrophosphate was dissolved in 25 ml. of water. The zinc powder was added to the solution with stirring to form a difficultly workable mix that would set up like concrete after a few minutes.

Three batteries were made in the manner described above, except that the slurry of Example III above was used to form the anodes. The mix consistency was very difficult to work with, but operable batteries resulted. These had an average OCV of 6.752 votls, an average CCV of 6.391 volts, and operated the flash simulator from 12 to 15 times before reaching 3.0 volts. The time for the 10th cycle averaged 5.6 seconds.

EXAMPLE IV

|  | Wt. | Wt.% |
|---|---|---|
| Zinc powder | 150 | 84.9 |
| Water | 25.36 | 14.4 |
| Hydroxyethyl cellulose | 0.5 | 0.3 |
| Carbon black | .75 | 0.4 |
| Tetrasodium pyrophosphate | .04 | .02 |
| Total | 176.65 | 100.0 |

0.4 grams of a ten percent by weight solution of tetrasodium pyrophosphate was dissolved in 25 ml. of water with stirring. The hydroxyethyl cellulose was stirred in, forming a gel. The carbon black and zinc powder were blended by shaking in a container, then added to the gel with stirring, forming a paste. The carbon black used was Shawinegan Black, in the 50% compressed form, as sold Shawinegan Products Corp., N.Y., N.Y.

Three batteries were made in the manner described above, except that the slurry of Example IV above was used to form the anodes. These batteries had an average OCV of 6.692 volts, an average CCV of 6.365, and operated the flash simulator for 19, 22 and 26 cycles before reaching 3.0 volts. The charge times for the 10th cycle were 5.0, 4.7 and 4.5 seconds, respectively. Of the two batteries that went more than 20 cycles without reaching 3.0 volts, only one time for the 20th cycle was observed; this was 5.8 seconds for the battery that went to 3.0 volts in 22 cycles.

EXAMPLE V

|  | Wt. | Wt.% |
|---|---|---|
| Zinc powder | 150 | 85.2 |
| Carbon black | 0.75 | 0.4 |
| Tetrasodium pyrophosphate | 0.04 | 0.02 |
| Water | 25.36 | 14.4 |
| Total | 176.15 | 100.0 |

0.4 grams of a ten percent by weight solution of tetrasodium pyrophosphate was added to 25 ml. of water with stirring. The zinc powder and carbon black (the same black as in Example IV) were pre-blended by shaking together, and added to the solution with stirring to form a paste.

Three batteries were made in the manner describec above, except that the slurry composition of Example V was used to form the anodes. One of these batteries failed, due to internal short circuits. The other two had an average performance of OCV=6.794 volts; CCV=6.439 volts; 24 cycles of operation of the flash simulator before reaching 3.0 volts; 4.8 seconds for the 10th cycle, and 5.7 seconds for the 20th cycle.

EXAMPLE VI

|  | Wt. | Wt.% |
|---|---|---|
| Zinc powder | 150 | 85.6 |
| Water | 25 | 14.3 |
| Hydroxyethyl cellulose | 0.15 | .09 |
| Total | 175.15 | 100.0 |

The hydroxyethyl cellulose was stirred into the water, and the zinc powder was blended in with stirring to form a smooth paste.

Three batteries were made in the manner described above, except that the slurry of Example VI was used to form the anodes. These batteries had an average OCV of 6.764, an average CCV of 6.441. They operated the flash simulator for 25, 27 and 25 cycles, respectively, before reading 3.0 volts. The corresponding times for the 10th cycle were 4.7, 4.5 and 4.5 seconds, respectively. The times for the 20th cycle were 5.4, 5.1, and now observed, respectively.

The essential conclusions from the above experiments are that batteries of excellent performance can be made by using anode slurries containing only water and zinc powder. However, a great improvement in workability, that would be expected to result in higher yields and greater reliability, can be attained by the addition of a very small amount of hydroxyethyl cellulose. Tetrasodium pyrophosphate, initially speculated to be of assistance as a blending agent, appears to affect both workability and performance adversely, although when used in combination with a small amount of carbon black, as in Example V above, good performance is attained.

As noted above, an important step in the process of forming slurry anodes in accordance with the invention is the placement of the aqueous zinc slurry at the electrode site before the electrolytes are added. Equilibrium in the battery is reached most quickly if a separator pre-soaked in electrolyte as described above is employed. However, good results have also been attained using separators that have not been pre-soaked, relying on the electrolyte in the cathode slurry as the source for both the separator and the anode slurry. To put the matter somewhat differently, the separator may become soaked with electrolyte solution either by being pre-soaked in a solution of electrolytes, or by contact with a cathode slurry containing a solution of electrolytes. For the latter purpose, slightly more of the $ZnCl_2$ and $NH_4Cl$, as well as a little additional water, may be included for this purpose so that the same equilibrium concentrations are attained. Since dry separators are much more convenient to use in a manufacturing process, in the presently preferred practice of the invention dry cellophane separators are employed. When a dry separator is used, however, it should be placed in contact with the cathode slurry first, to reduce the tendency to dry out the anode and possibly disrupt it during assembly.

A second important aspect of the practice of the invention, illustrated by the above examples, is the use of thin anode slurries containing very little total zinc by prior art standards. The overall reaction in the Lechlanche cell requires one half mole of zinc for each mole of $MnO_2$, or 0.376 grams of zinc per gram of $MnO_2$. Conventional Leclanche cells include considerably more than this theoretical amount of zinc; so much so that it is conventional to measure the performance of a Leclanche cell in terms of cathode efficiency. In contrast, ratios of zinc to $MnO_2$ in slurry-slurry cells in accordance with the invention may contain theoretical or even less than theoretical amounts of zinc. Surprisingly, the reduction in internal impedance gained by a very thin slurry anode appears to outweigh whatever theoretical loss in ultimate capacity may be involved. Specifically, batteries made as described above but with 0.4 (less than theoretical), 0.8 (about theoretical) and 1.1 (more than theoretical) grams of zinc slurry per anode showed progressively lower CCV's, with about the same ability to operate the flash simulator described above, with increasing anode weight. In this context, it is noted that the ability to lay down a very thin slurry layer without discontinuities is related to the use of aqueous zinc slurries without electrolytes, as slurries with electrolytes normally require more than twice the thickness for a uniform deposit.

The reduction in internal impedance and increase in available high current drain capability achieved by the use of thin slurry anodes in accordance with the invention seems to be more directly related to the thickness of the slurry layer than to the ratio of zinc to $MnO_2$, though the two tend to go together. In the above examples, a 0.5 gram zinc slurry patch gives about 0.0165 grams of slurry per square centimeter, or about 0.014 grams of zinc per square centimeter, with a thickness of about 1 mil or between 0.002 and 0.003 centimeters. This is presently preferred as affording ease of manufacture coupled with excellent performance. The 3.5 gram cathode slurry coverage is about 0.116 grams of slurry per square centimeter, or about 0.06 gm/cm² of $MnO_2$. Increasing the cathode slurry to 0.133 gm/cm² has been found to improve the high current drain performance of the battery, though not proportionately, while decreasing the cathode slurry would more than proportionately decrease the ability of the battery to perform, for example, in the electronic flash simulator test described above. Basically, the weight of the cathode slurry is determinative of the ultimate capacity of the battery, at least from about 0.03 to 0.15 gm/cm². The weight of the cathode is selected within this range in dependence on considerations of total battery thickness and ease of manufacture, and yields in production, as well as adequate capacity to perform. On the other hand, any increase in the anode thickness would be deleterious to performance. Some decrease in the anode thickness would no doubt be helpful, at present, it appears that the thinnest slurry coating that can be laid down uniformly is the best. The presently preferred range is from about 0.010 to 0.015 grams of zinc per square centimenter. The useful range is from about 0.009 to 0.024 gm/cm² for high current drain applications.

While the invention has been described with respect to the details of particular presently preferred embodiments thereof, many changes and variations will occur to those skilled in the art upon reading this description. Such can obviously be made without departing from the scope of the invention.

Having described the invention, what is claimed is:

1. A thin flat laminar battery, comprising a series of cells each including a cathode slurry layer and an anode slurry layer on opposite sides of a separator, in which the anode slurry layers comprise about 80 to 85 parts by weight of zinc powder, about 10 to 12 parts by weight of water, from about 1 to about 2 parts by weight of zinc chloride, from about 2 to about 4 parts by weight of ammonium chloride, and from about 1 to about 3 parts by weight of mercury.

2. A slurry anode composition, comprising, by weight, from 80 to 85 parts of zinc powder, from 10 to 12 parts of water, from 1 to 2 parts of zinc chloride, from 2 to 4 parts of ammonium chloride, and from 1 to 3 parts of mercury as an amalgam on said zinc powder.

3. A thin flat laminar battery, comprising a series of cells each including a cathode slurry layer and an anode slurry layer on either side of and in contact with a cellophane separator, in which each cathode slurry layer comprises a dispersion of about 8 parts by weight of manganese dioxide and 1 part by weight of carbon black in an aqueous solution of electrolytes containing from 23 to 30 percent by weight of water, based on the weight of cathode slurry, and in which each anode slurry comprises a dispersion of amalgamated zinc powder in an aqueous solution in equilibrium with the solution in the cathode slurry and containing from 10 to 12 percent by weight of water based on the weight of anode slurry.

4. A thin flat laminar cell, comprising a cathode slurry layer and an anode slurry layer on either side of and in contact with a cellophane separator, in which said cathode slurry layer comprises a dispersion of about 8 parts by weight of manganese dioxide and 1 part by weight of carbon black in an aqueous solution of electrolytes containing from 23 to 30 percent by weight of water, based on the weight of cathode slurry, and in which said anode slurry comprises a dispersion of amalgamated zinc powder in an aqueous solution in equilibrium with the solution in the cathode slurry and containing from 10 to 12 percent by weight of water based on the weight of anode slurry.

5. A thin flat laminar cell, comprising a cathode slurry layer and an anode slurry layer on either side of and in contact with a separator, in which said cathode slurry layer comprises a dispersion of manganese dioxide and carbon black in an aqueous solution of electrolytes containing from 23 to 30 percent by weight of water, based on the weight of cathode slurry, and in which said anode slurry comprises a dispersion of amalgamated zinc powder in an aqueous solution in equilibrium with the solution in the cathode slurry and containing from 10 to 12 percent by weight of water based on the weight of anode slurry, said anode slurry containing less than 0.376 grams of zinc per gram of manganese dioxide.

6. A thin flat laminar cell, comprising a cathode slurry layer and an anode slurry layer on either side of and in contact with a separator, in which said cathode slurry layer comprises a dispersion of manganese dioxide and carbon black in an aqueous solution of electrolytes, and in which each anode slurry comprises a dispersion of zinc powder in an aqueous solution in equilibrium with the solution in the cathode slurry and containing less than one half mole of zinc per mole of $MnO_2$.

7. A thin flat laminar battery, comprising a series of cells each including a cathode slurry layer and an anode slurry layer on either side of and in contact with a separator, in which each cathode slurry layer comprises a dispersion of manganese dioxide and carbon black in an aqueous solution of electrolytes, and in which each anode slurry comprises a dispersion of zinc particles in an aqueous solution in equilibrium with the solution in the cathode slurry and containing from 10 to 12 percent by weight of water based on the weight of anode slurry.

8. A thin laminar Leclanche cell, comprising an anode slurry layer, a cathode slurry layer, and a separator between said anode slurry layer and said cathode slurry layer, in which said cathode slurry layer comprises manganese dioxide and said anode slurry layer comprises zinc in an amount less than one half mole of zinc per mole of manganese dioxide.

9. A thin laminar Leclanche cell, comprising an anode slurry layer, a cathode slurry layer, and a separator between said anode slurry layer and said cathode slurry layer, in which said cathode slurry layer comprises manganese dioxide and said anode slurry comprises a dispersion of particulate zinc containing from 0.009 to 0.024 grams of zinc per square centimeter of said anode slurry layer.

10. The cell of claim 9, in which said anode slurry layer contains from 0.010 to 0.015 grams of zinc per square centimeter.

11. A thin flat laminar battery, comprising a series of cells each including a cathode slurry layer and an anode slurry layer on opposite sides of a separator, in which the anode slurry layers comprise about 80 to 85 parts by weight of amalgamated zinc powder, in a solution of zinc chloride and ammonium chloride in about 10 to 12 parts by weight of water, said anode slurry layers containing between 0.009 and 0.024 grams of zinc per square centimeter.

12. A thin flat laminar battery, comprising a series of cells each including a cathode slurry layer and an anode slurry layer on either side of and in contact with a separator, in which each cathode slurry layer comprises a dispersion of manganese dioxide and carbon black in an aqueous solution of electrolytes containing from 23 to 30 percent by weight of water, based on the weight of cathode slurry, and in which each anode slurry comprises a dispersion of amalgamated zinc powder in an aqueous solution in equilibrium with the solution in the cathode slurry and containing from 0.009 to 0.024 grams of zinc per square centimeter.

13. The battery of claim 12, in which said anode slurry layers each contain from 0.010 to 0.015 grams of zinc per square centimeter.

14. A thin flat laminar cell, comprising a cathode slurry layer and an anode slurry layer on either side of and in contact with a separator, in which said cathode slurry layer comprises a dispersion of manganese dioxide and carbon black in an aqueous solution of electrolytes, and in which said anode slurry comprises a dispersion of amalgamated zinc powder in an aqueous solution in equilibrium with the solution in the cathode slurry and containing from 0.009 to 0.024 grams of zinc per square centimeter of anode slurry.

15. The cell of claim 14, in which said anode slurry contains from 0.010 to 0.015 grams of zinc per square centimeter.

* * * * *